United States Patent
Marrin et al.

(10) Patent No.: US 7,532,217 B2
(45) Date of Patent: May 12, 2009

(54) METHODS AND SYSTEMS FOR SCORING MULTIPLE TIME-BASED ASSETS AND EVENTS

(75) Inventors: Christopher F. Marrin, Los Altos, CA (US); James R. Kent, Gahanna, OH (US); Peter G. Broadwell, Palo Alto, CA (US); Robert K. Myers, Santa Cruz, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 11/384,229

(22) Filed: Mar. 17, 2006

(65) Prior Publication Data

US 2006/0238540 A1 Oct. 26, 2006

Related U.S. Application Data

(63) Continuation of application No. 10/990,742, filed on Nov. 16, 2004, which is a continuation-in-part of application No. 10/712,858, filed on Nov. 12, 2003, now abandoned, which is a continuation of application No. 09/632,351, filed on Aug. 3, 2000, now Pat. No. 6,707,456.

(60) Provisional application No. 60/146,972, filed on Aug. 3, 1999.

(51) Int. Cl.
*G06T 15/00* (2006.01)

(52) U.S. Cl. ............... 345/473; 345/474; 345/475; 700/245; 715/201; 715/723

(58) Field of Classification Search ......... 345/473–475; 700/245; 715/513, 517, 201, 202, 203, 204, 715/723
See application file for complete search history.

(56) References Cited

U.S. PATENT DOCUMENTS

| | | | |
|---|---|---|---|
| 4,538,188 A | 8/1985 | Barker et al. | 386/54 |
| 5,151,998 A | 9/1992 | Capps | 345/440 |
| 5,204,969 A | 4/1993 | Capps et al. | 715/961 |
| 5,434,959 A | 7/1995 | Von Ehr, II et al. | 345/441 |
| 5,440,678 A | 8/1995 | Eisen et al. | 715/537 |
| 5,467,443 A | 11/1995 | Johnson et al. | 345/672 |
| 5,477,337 A | 12/1995 | Schuler | 345/441 |
| 5,500,927 A | 3/1996 | Sander-Cederlof et al. | 345/442 |
| 5,517,320 A | 5/1996 | Schuler | 386/46 |
| 5,532,830 A | 7/1996 | Schuler | 386/125 |
| 5,592,602 A | 1/1997 | Edmunds et al. | 345/474 |
| 5,594,855 A | 1/1997 | Von Ehr, II et al. | 345/442 |

(Continued)

OTHER PUBLICATIONS

Marrin et al., Steerable Media: Interactive Television via Video Synthesis, WEB3D 2001, pp. 7-15.*

(Continued)

*Primary Examiner*—Phu K Nguyen
(74) *Attorney, Agent, or Firm*—Blakely, Sokoloff, Taylor & Zafman LLP (57) ABSTRACT

The methods and systems for scoring multiple time-based assets and events include declaratively playing a first media sequence; and declaratively initiating a second media sequence at a predetermined time prior to an end point of the first media sequence wherein the predetermined time is independent from an amount of time utilized to play the first media sequence.

11 Claims, 7 Drawing Sheets

U.S. PATENT DOCUMENTS

| | | | |
|---|---|---|---|
| 5,623,593 | A | 4/1997 | Spells, III .................... 345/472 |
| 5,680,639 | A * | 10/1997 | Milne et al. ............... 715/500.1 |
| 5,751,281 | A * | 5/1998 | Hoddie et al. ............ 715/500.1 |
| 5,764,241 | A | 6/1998 | Elliott et al. .................... 707/1 |
| 5,808,610 | A | 9/1998 | Benson et al. ............... 345/473 |
| 5,940,080 | A | 8/1999 | Ruehle et al. ............... 715/788 |
| 6,064,393 | A | 5/2000 | Lengyel et al. |
| 6,084,590 | A | 7/2000 | Robotham et al. .......... 345/611 |
| 6,088,027 | A | 7/2000 | Konar et al. ................. 345/419 |
| 6,088,035 | A | 7/2000 | Sudarsky et al. ............ 345/421 |
| 6,124,864 | A | 9/2000 | Madden et al. .............. 345/473 |
| 6,128,712 | A * | 10/2000 | Hunt et al. ................... 711/158 |
| 6,147,695 | A | 11/2000 | Bowen et al. ................ 345/630 |
| 6,160,907 | A | 12/2000 | Robotham et al. .......... 382/154 |
| 6,175,840 | B1 * | 1/2001 | Chen et al. ............... 715/501.1 |
| 6,192,156 | B1 | 2/2001 | Moorby ....................... 382/240 |
| 6,249,285 | B1 | 6/2001 | Madden et al. .............. 345/419 |
| 6,266,053 | B1 * | 7/2001 | French et al. ............... 715/255 |
| 6,297,825 | B1 | 10/2001 | Madden et al. .............. 345/589 |
| 6,337,703 | B1 | 1/2002 | Konar et al. ................. 715/858 |
| 6,359,619 | B1 | 3/2002 | Waters et al. |
| 6,373,490 | B1 | 4/2002 | Bendiksen et al. .......... 382/187 |
| 6,442,658 | B1 * | 8/2002 | Hunt et al. ................... 711/158 |
| 6,459,439 | B1 | 10/2002 | Ahlquist, Jr. et al. ........ 345/619 |
| 6,567,091 | B2 | 5/2003 | Dye et al. |
| RE38,284 | E * | 10/2003 | Allen et al. ............... 715/500.1 |
| 6,707,456 | B1 * | 3/2004 | Marrin et al. ................ 345/473 |
| 6,756,997 | B1 * | 6/2004 | Ward et al. ................... 715/716 |
| 6,791,574 | B2 | 9/2004 | Hoch et al. |
| 6,839,059 | B1 * | 1/2005 | Anderson et al. ........... 345/501 |
| 7,088,374 | B2 | 8/2006 | David et al. ................. 345/619 |
| 7,216,288 | B2 * | 5/2007 | Westerink et al. ........... 715/201 |
| 7,330,186 | B2 * | 2/2008 | Marrin et al. ................ 345/473 |
| 2003/0023755 | A1 | 1/2003 | Harris et al. ................. 717/136 |
| 2003/0088511 | A1 | 5/2003 | Karboulonis et al. .......... 705/40 |
| 2003/0093790 | A1 | 5/2003 | Logan et al. ................... 386/69 |
| 2003/0123665 | A1 | 7/2003 | Dunston et al. .............. 380/201 |

OTHER PUBLICATIONS

Schmitz, P., "The SMIL 2.0 Timing and Synchronization Model", Technical Report Microsoft Research MSR TR, XX.XX. No. MSR-TR-200101, Jan. 2, 2001, pp. 1-20, XP002376474.

Ayars, et al., "Synchronized Multimedia Integration Language (SMIL 2.0)", W3C Recommendation, Aug. 7, 2001, XP002464709. (Retrieved from the Internet (Jan. 15, 2007): URL:http://www.w3.org.

* cited by examiner

Figure 5

METHODS AND SYSTEMS FOR SCORING MULTIPLE TIME-BASED ASSETS AND EVENTS

CROSS REFERENCE RELATED APPLICATIONS

This application is a continuation of Ser. No. 10/990,742 filed Nov. 16, 2004, which a continuation-in-part of Ser. No. 10/712,858 filed on Nov. 12, 2003, now abandoned which is a continuation of application Ser. No. 09/632,351 filed on Aug. 3, 2000 (now issued U.S. Pat. No. 6,707,456), which claims the benefit of U.S. Provisional Application No. 60/146,972 filed on Aug. 3, 1999.

FIELD OF INVENTION

This invention relates generally to modeling language for 3D graphics and, more particularly, to temporal manipulation of media assets.

BACKGROUND

Conventional modeling languages for real-time 3D scene rendering have traditionally focused on aspects of scene structure, geometry, appearance, and, to some degree, animation, and interactivity. This focus has been driven by the following two factors. First, 3D computer graphics applications have been geared toward user-driven experiences and, thus, tend to be structured around a rendered response to events. Second, the majority of these applications take a "render it as fast as you can" approach to scene updates, with little respect paid to fidelity of the time base. Conventional modeling languages fail to provide the accuracy of temporal relationship between two media assets. For example, if a video asset and an audio asset are to start at the same time, this can be achieved by prescribing start time for each asset independent of other assets. This allows the start times to be slightly different. It is desirable that the start time for each asset be controlled by the same field, thereby resulting in accurate synchronization of the assets. Media assets include audio media, video media, animations, audio-visual media, images or events.

As full motion video and high fidelity audio are integrated into a scene rendering mix, it is desirable to deliver high quality television-like viewing experiences while supporting viewer interactivity. It is desirable to provide a passive viewing experience that is more television-like and not a web page-like viewing experience.

In a declarative markup language, the semantics required to attain the desired outcome are implicit in the description of the outcome. It is not necessary to provide a separate procedure (i.e., write a script) to get the desired outcome. One example of a declarative language is HyperText Markup Language (HTML).

Various approaches to scoring animation and playback have previously been developed in other computer-based media, including Macromedia Director and the WSC's Synchronized Multimedia Integration Language (SMIL). However, these existing scoring systems do not allow for declarative composition of a real-time scene wherein the independent scores are dynamically composed and decomposed hierarchically, structuring time in manner akin to the spatial scene graph. For example structuring blocks of time to be next to each other or structuring block of time to be parallel (synchronized) with each other. The conventional scoring systems do not allow variable rate and direction of score evaluation to be done declaratively, and neither do they allow declarative implementation of a modular computation strategy based upon a normalized "fraction done" output, suitable for rapid assembly and reuse of behavioral animation.

SUMMARY

The methods and systems for scoring multiple time-based assets and events include declaratively playing a first media sequence; and declaratively initiating a second media sequence at a predetermined time prior to an end point of the first media sequence wherein the predetermined time is independent from an amount of time utilized to play the first media sequence.

DETAILED DESCRIPTION

Figure 1A:
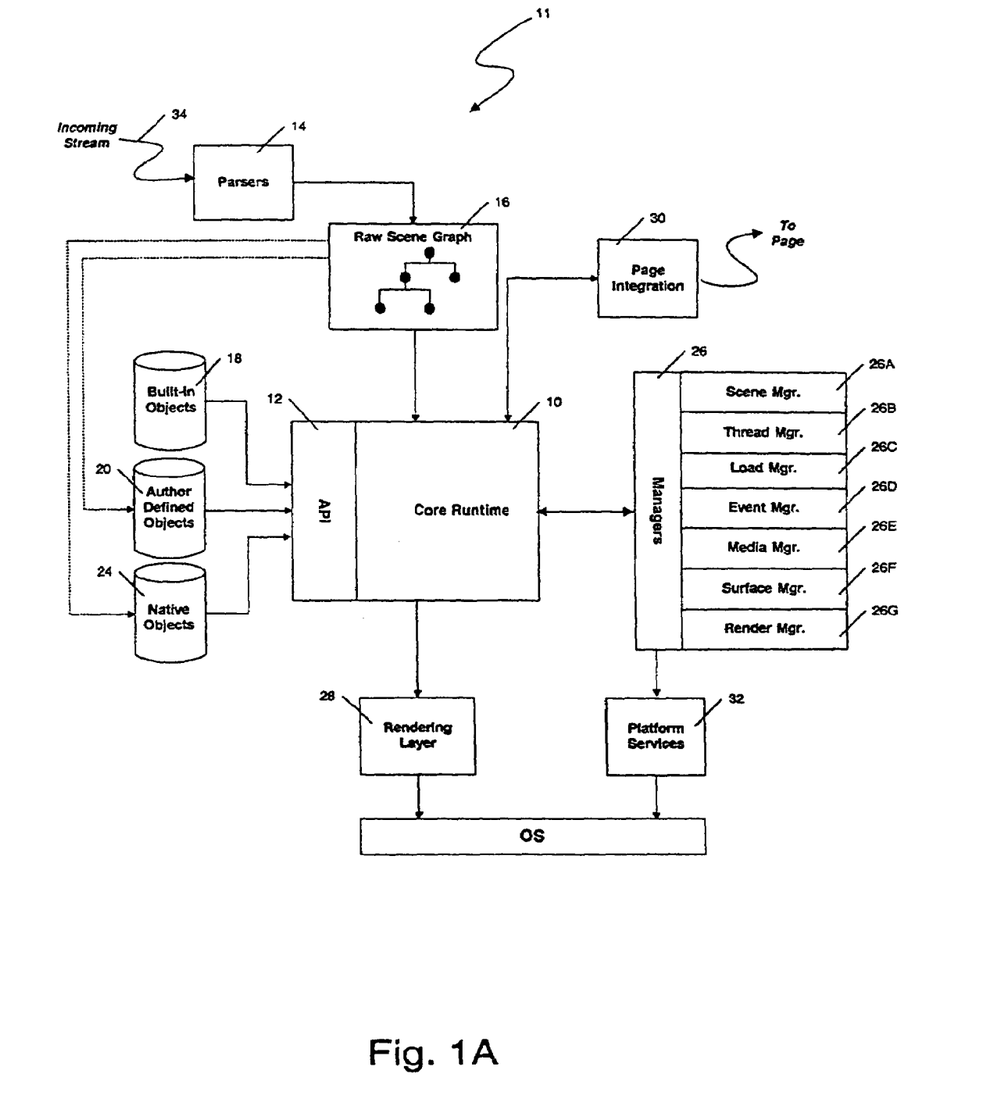
FIG. 1A shows the basic architecture of Blendo.

Blendo is an exemplary embodiment of the present invention that allows temporal manipulation of media assets including control of animation and visible imagery, and cueing of audio media, video media, animation and event data to a media asset that is being played. FIG. 1A shows basic Blendo architecture. At the core of the Blendo architecture is a Core Runtime module 10 (Core hereafter) which presents various Application Programmer Interface (API hereafter) elements and the object model to a set of objects present in system 11. During normal operation, a file is parsed by parser 14 into a raw scene graph 16 and passed on to Core 10, where its objects are instantiated and a runtime scene graph is built. The objects can be built-in objects 18, author defined objects 20, native objects 24, or the like. The objects use a set of available managers 26 to obtain platform services 32. These platform services 32 include event handling, loading of assets, playing of media, and the like. The objects use rendering layer 28 to compose intermediate or final images for display. A page integration component 30 is used to interface Blendo to an external environment, such as an HTML or XML page.

In one embodiment, Blendo contains a system object with references to the set of managers 26. Each manager 26 provides the set of APIs to control some aspect of system 11. An event manager 26D provides access to incoming system events originated by user input or environmental events. A load manager 26C facilitates the loading of Blendo files and native node implementations. A media manager 26E provides the ability to load, control and play audio, image and video media assets. A render manager 26G allows the creation and management of objects used to render scenes. A scene manager 26A controls the scene graph. A surface manager 26F allows the creation and management of surfaces onto which scene elements and other assets may be composited. A thread manager 26B gives authors the ability to spawn and control threads and to communicate between them.

Figure 1B:
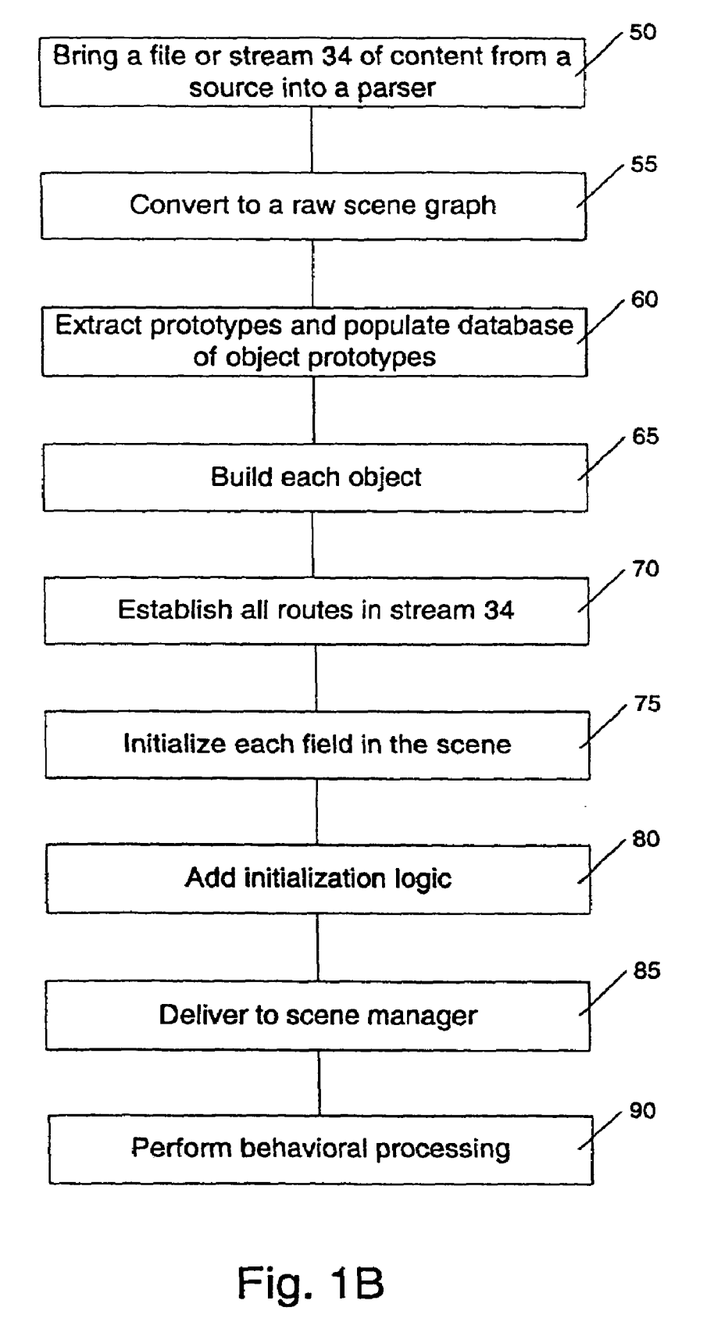
FIG. 1B is a flow diagram illustrating flow of content through Blendo engine.

FIG. 1B illustrates in a flow diagram, a conceptual description of the flow of content through a Blendo engine. In block 50, a presentation begins with a source which includes a file or stream 34 (FIG. 1A) of content being brought into parser 14 (FIG. 1A). The source could be in a native VRML-like textual format, a native binary format, an XML based format, or the like. Regardless of the format of the source, in block 55, the source is converted into raw scene graph 16 (FIG. 1A). The raw scene graph 16 can represent the nodes, fields and other objects in the content, as well as field initialization values. It also can contain a description of object prototypes, external prototype references in the stream 34, and route statements.

The top level of raw scene graph 16 include nodes, top level fields and functions, prototypes and routes contained in the file. Blendo allows fields and functions at the top level in addition to traditional elements. These are used to provide an interface to an external environment, such as an HTML page. They also provide the object interface when a stream 34 is used as the contents of an external prototype.

Each raw node includes a list of the fields initialized within its context. Each raw field entry includes the name, type (if given) and data value(s) for that field. Each data value includes a number, a string, a raw node, and/or a raw field that can represent an explicitly typed field value.

In block 60, the prototypes are extracted from the top level of raw scene graph 16 (FIG. 1A) and used to populate the database of object prototypes accessible by this scene.

The raw scene graph 16 is then sent through a build traversal. During this traversal, each object is built (block 65), using the database of object prototypes.

In block 70, the routes in stream 34 are established. Subsequently, in block 75, each field in the scene is initialized. This is done by sending initial events to non-default fields of objects. Since the scene graph structure is achieved through the use of node fields, block 75 also constructs the scene hierarchy as well. Events are fired using in-order traversal. The first node encountered enumerates fields in the node. If a field is a node, that node is traversed first.

As a result the nodes in that particular branch of the tree are initialized. Then, an event is sent to that node field with the initial value for the node field.

After a given node has had its fields initialized, the author is allowed to add initialization logic (block 80) to prototyped objects to ensure that the node is fully initialized at call time. The blocks described above produce a root scene. In block 85 the scene is delivered to the scene manager 26A (FIG. 1A) created for the scene. In block 90, the scene manager 26A is used to render and perform behavioral processing either implicitly or under author control.

A scene rendered by the scene manager 26A can be constructed using objects from the 20 Blendo object hierarchy. Objects may derive some of their functionality from their parent objects, and subsequently extend or modify their functionality. At the base of the hierarchy is the Object. The two main classes of objects derived from the Object are a Node and a Field. Nodes contain, among other things, a render method, which gets called as part of the render traversal. The data properties of nodes are called fields. Among the Blendo object hierarchy is a class of objects called Timing Objects, which are described in detail below. The following code portions are for exemplary purposes. It should be noted that the line numbers in each code portion merely represent the line numbers for that particular code portion and do not represent the line numbers in the original source code.

Timing Objects

Timing objects include a TimeBase node. This is included as a field of a timed node and supplies a common set of timing semantics to the media. Through node instancing, the TimeBase node can be used for a number of related media nodes, ensuring temporal synchronization. A set of nodes including the Score node is utilized for sequencing media events. The Score node is a timed node and derives its timing from a TimeBase. The Score node includes a list of Cue nodes, which emit events at the time specified. Various timing objects, including Score, are described below.

The following code portion illustrates the TimeNode node. A description of the functions in the node follows thereafter.

```
1)  TimedNode ChildNode {
2)      field TimeBaseNode timeBase NULL
3)      function Time getduration( )
4)      function void updateStartTime(Time now, Time mediaTime, Float
          rate)
5)      function void updateStopTime(Time now, Time mediaTime, Float
          rate)
6)      function void updateMediaTime(Time now, Time mediaTime,
          Float rate)
}
```

This object is the parent of all nodes controlled by a TimeBaseNode. In line 2 of the code portion, the TimeBase field contains the controlling TimeBaseNode, which makes the appropriate function calls listed below when the time base starts, stops or advances.

In line 3, the getDuration function returns the duration of the TimedNode. If unavailable, a value of –1 is returned. This function is typically overridden by derived objects.

Line 4 lists the updateStartTime function. When called, this function starts advancing its related events or controlled media, with a starting offset specified by the mediaTime value. The updateStartTime function is typically overridden by derived objects.

Line 5 lists the updateStopTime function, which when called, stops advancing its related events or controlled media. This function is typically overridden by derived objects.

In line 6, the updateMediaTime function is called whenever mediaTime is updated by the TimeBaseNode. The updateMediaTime function is used by derived objects to exert further control over their media or send additional events.

The following code portion illustrates the IntervalSensor node.

```
1)  IntervalSensor : Timed Node {
2)      field Time cycleInterval 1
3)      field Float fraction 0
4)      field Float time     0
}
```

The IntervalSensor node generates events as time passes. IntervalSensor node can be used for many purposes including but not limited to drive continuous simulations and animations; to control periodic activities (e.g., one per minute); and to initiate single occurrence events such as an alarm clock.

The IntervalSensor node sends initial fraction and time events when its updateStartTime( ) function is called. In one embodiment, this node also sends a fraction and time event every time updateMediaTime( ) is called. Finally, final fraction and time events are sent when the updateStopTime( ) function is called.

In line 2 of the code portion, the cycleInterval field is set by the author to determine the length of time, measured in seconds, it takes for the fraction to go from 0 to 1. This value is returned when the getDuration( ) function is called.

Line 3 lists the fraction field, which generates events whenever the TimeBaseNode is running using equation (1) below:

$$\text{fraction}=\max(\min(\text{mediaTime}/\text{cycleInterval}, 1), 0) \qquad \text{Eqn. (1)}$$

Line 4 lists the time field, which generates events whenever the TimeBaseNode is running. The value of the time field is the current wall clock time.

The following code portion illustrates the Score node.

```
1)  Score : TimedNode{
2)      field ME CueNode cue [ ]
}
```

This object calls each entry in the cue field for every updateStartTime( ), updateMediaTime( ), and updateStopTime( ) call received. Calls to each cue entry returns the currently accumulated relative time. This value is passed to subsequent cue entries to allow relative offsets between cue entries to be computed.

In line 2 of the code portion, the cuefield holds the list of CueNode entries to be called 20 with the passage of media-Time.

The following code portion illustrates the TimeBaseNode node.

```
1)  TimeBaseNode : Node {
2)      field Time mediaTime 0
3)      function void   evaluate(Time time)
4)      function void   addClient(TimedNode node)
5)      function void   removeClient(TimedNode node)
6)      function 1nt32  getNumClients 0
7)      function TimedNode getClient(1nt32 index)
}
```

This object is the parent of all nodes generating media-Time. Line 2 of the code portion lists the mediaTime field, which generates an event whenever mediaTime advances. MediaTime field is typically controlled by derived objects.

Line 3 lists the evaluate function, which is called by the scene manager when time advances if this TimeBaseNode has registered interest in receiving time events.

Line 4 lists addClient function, which is called by each TimedNode when this TimeBaseNode is set in their timeBase field. When mediaTime starts, advances or stops, each client in the list is called. If the passed node is already a client, this function performs no operations.

Line 5 lists the removeClient function, which is called by each TimedNode when this TimeBaseNode is no longer set in their timeBase field. If the passed node is not in the client list, this function performs no operations.

Line 6 lists the getNumClients function, which returns the number of clients currently in the client list.

Line 7 lists the getclient function, which returns the client at the passed index. If the index is out of range, a NULL value is returned.

The following code portion illustrates the TimeBase node.

```
1)  TimeBase : TimeBaseNode {
2)      field Bool loop         false
3)      field Time startTime            0
4)      field Time playTime0
5)      field Time stopTime             0
6)      field Time              mediastartTime 0
7)      field Time              mediaStopTime 0
8)      field Float rate        1
9)      field Time duration     0
10)     field Bool enabled      true
11)     field fool isActive     false
}
```

This object controls the advancement of mediaTime. TimeBase can start, stop and resume this value, as well as make mediaTime loop continuously. Time Base allows mediaTime to be played over a subset of its range.

In line 2 of the code portion, the loop field controls whether or not mediaTime repeats its advancement when mediaTime reaches the end of its travel.

In line 3, the startTime field controls when mediaTime starts advancing. When startTime, which is in units of wall clock time, is reached the TimeBase begins running. This is true as long as stopTime is less than startTime. When this occurs mediaTime is set to the value of mediastartTime if rate is greater than or equal to 0. If mediaStartTime is out of range (see mediaStartTime for a description of its valid range), mediaTime is set to 0. If the rate is less than 0, mediaTime is set to mediaStopTime. If mediaStopTime is out of range, mediaTime is set to duration. The TimeBase continues to run until stopTime is reached or mediaStopTime is reached (mediastartTime if rate is less than 0). If a startTime event is received while the TimeBase is running, it is ignored.

In lines 4 and 5, the playTime field behaves identically to startTime except that mediaTime is not reset upon activation. The playTime field allows mediaTime to continue advancing after the TimeBase is stopped with stopTime. If both playTime and startTime have the same value, startTime takes precedence. If a playTime event is received while the TimeBase is running, the event is ignored. The stopTime field controls when the TimeBase stops.

In line 6, the mediastartTime field sets the start of the sub range of the media duration over which mediaTime shall run. The range of mediastartTime is from zero to the end of the duration (0 . . . duration). If the value of mediaStartTime field is out of range, 0 is used in its place.

In line 7, the mediaStopTime field sets the end of the sub range of the media duration over which mediaTime runs. The range of mediaStopTime is from zero to the end of the duration (0 . . . duration). If the value of mediaStopTime is out of range, the duration value is used in its place.

In line 8, the rate field allows mediaTime to run at a rate other than one second per second of wall clock time. The rate provided in the rate field is used as an instantaneous rate. When the evaluate function is called, the elapsed time since the last call is multiplied by rate and the result is added to the current mediaTime.

In line 9, the duration field generates an event when the duration of all clients of this TimeBase have determined their duration. The value of the duration field is the same as the client with the longest duration.

In line 10, the enabled field enables the TimeBase. When enabled goes false, isActive goes false if it was true and mediaTime stops advancing. While false, startTime and playTime are ignored. When enabled field goes true, startTime and playTime are evaluated to determine if the TimeBase should begin running. If so, the behavior as described in startTime or playTime is performed.

Line 11 lists the isActive field, which generates a true event when the TimeBase becomes active and a false event when the timefalse becomes inactive.

The following code snippet illustrates the CueNode node.

```
1)  Cue Node: Node {
2)    field Float offset –1
3)    field float delay 0
4)    field Bool enabled true
5)    field Int32 direction 0
6)    function void updateStartTime(Time now,
         Time mediaTime, Float rate)
7)    function void updateStopTime(Time now,
         Time mediaTime, Float rate)
8)    function Time evaluate(Time accumulated, Time now, Time
mediaTime, Float rate)
9)    function Time getAccumulatedTime(Time accumulated)
10)   function void fire(Time now, Time mediaTime) }
```

This object is the parent for all objects in the Score's cue list. In line 2 of the code portion, the offset field establishes a 0 relative offset from the beginning of the sequence. For instance, a value of 5 will fire the CueNode when the incoming mediaTime reaches a value of 5.

In line 3, the delay field establishes a relative delay before the CueNode fires. If offset is a value other than –1 (the default), this delay is measured from offset. Otherwise the delay is measured from the end of the previous CueNode or from 0 if this is the first CueNode. For instance, if offset has a value of 5 and delay has a value of 2, this node will fire when mediaTime reaches 7. If offset has a value of –1 and delay has a value of 2, this node will fire 2 seconds after the previous CueNode ends.

In line 4, if the enabled field is false, the CueNode is disabled. The CueNode behaves as though offset and delay were their default values and it does not fire events. If it is true, the CueNode behaves normally.

In line 5, the direction field controls how this node fires relative to the direction of travel of mediaTime. If this field is 0, this node fires when this node's offset and/or delay are reached, whether mediaTime is increasing (rate greater than zero) or decreasing (rate less than zero). If direction field is less than zero, this node fires only if its offset and/or delay are reached when mediaTime is decreasing. If direction field is greater than zero, this node fires only if this node's offset and/or delay are reached when mediaTime is increasing.

Line 6 lists the updateStartTime function, which is called when the parent Score receives an updateStartTime( ) function call. Each CueNode is called in sequence.

Line 7 lists the updateStopTime function, which is called when the parent Score 25 receives an updateStopTime( ) function call. Each CueNode is called in sequence.

Line 8 lists the evaluate function, which is called when the parent Score receives an updateMediaTime function call. Each CueNode is called in sequence and must return its accumulated time. For instance, if offset is 5 and delay is 2, the CueNode would return a value of 7. If offset is –1 and delay is 2, the CueNode would return a value of the incoming accumulated time plus 2. This is the default behavior. Some CueNodes (such as IntervalCue) have a well defined duration as well as a firing time.

In line 9, the getAccumulatedTime function returns the accumulated time using the same calculation as in the evaluates function.

Line 10 lists the fire function, which is called from the default evaluates function when the CueNode reaches its firing time. The fire function is intended to be overridden by the specific derived objects to perform the appropriate action.

The following code portion illustrates the MediaCue node.

```
1)  MediaCue CueNode TimeBaseNode {
2)    field Time mediastartTime 0
3)    field Time mediaStopTime 0
4)    field Time duration 0
5)    field Bool isActive       false
      }
```

This object controls the advancement of mediaTime when this CueNode is active. MediaCue allows mediaTime to be played over a subset of its range. MediaCue is active from the time determined by the offset and/or delay field for a length of time determined by mediaStopTime minus mediaStartTime. The value MediaCue returns from getAccumulatedTime( ) is the value computed by adding the default function to the mediaStopTime and subtracting the mediaStartTime. This node generates mediaTime while active, which is computed by subtracting the firing time plus mediaStartTime from the incoming mediaTime. MediaCue therefore advances mediaTime at the same rate as the incoming mediaTime.

In line 2 of the code portion, the mediaStartTime field sets the start of the sub range of the media duration over which mediaTime runs. The range of mediaStartTime is from zero to the end of the duration (0 . . . duration). If the value of mediaStartTime field is out of range, 0 is utilized in its place.

In line 3, the mediastopTime field sets the end of the sub range of the media duration over which mediaTime runs. The range of mediaStopTime is from zero to the end of the duration (0 . . . duration). If the value of mediaStopTime field is out of range, duration is utilized in its place.

In line 4, the duration field generates an event when the duration of all clients of this TimeBaseNode have determined their duration. The value of duration field is the same as the client with the longest duration.

Line 5 lists the isActive field, which generates a true event when this node becomes active and a false event when this node becomes inactive.

The following code portion illustrates the IntervalCue node.

```
1)  IntervalCue CueNode {
2)    field Float period 1
3)    field Bool rampup true
4)    field Float fraction 0
5)    field Bool isActive false
      }
```

This object sends fraction events from 0 to 1 (or 1 to 0 if rampup is false) as time advances. Line 2 of the code snippet lists the period field, which determines the time, in seconds, over which the fraction ramp advances.

In line 3, if the rampUp field is true (the default) the fraction goes up from 0 to 1 over the duration of the IntervalCue. If false, the fraction goes down from 1 to 0. If mediaTime is running backwards (when the rate is less than zero), the fraction goes down from 1 to 0 when rampUp field is true, and the fraction goes up from 0 to I when the rampUp field is false.

In line 4, the fraction field sends an event with each call to evaluates while this node is active. If mediaTime is moving forward, fraction starts to output when this node fires and stops when this nodes reaches its firing time plus period. The value of fraction is described as:

$$\text{fraction} = (\text{mediaTime} - \text{firing time}) * \text{period} \quad \text{Eqn. (2)}$$

Line 5 lists the isActive field, which sends a true event when the node becomes active and false when the node becomes inactive. If mediaTime is moving forward, the node becomes active when mediaTime becomes greater than or equal to firing time. This node becomes inactive when mediaTime becomes greater than or equal to firing time plus period. If mediaTime is moving backward, the node becomes active when mediaTime becomes less than or equal to firing time plus period and inactive when mediaTime becomes less than or equal to firing time. The firing of these events is affected by the direction field.

The following code portion illustrates the FieldCue node.

```
1) FieldCite : CueNode {
2)   field Field cueValue NULL
3)   field Field cueOut NULL
   }
```

This object sends cueValue as an event to cueOut when FieldCue fires. FieldCue allows any field type to be set and emitted. The cueOut value can be routed to a field of any type. Undefined results can occur if the current type of cueValue is not compatible with the type of the destination field.

In line 2 of the code portion, the cue Value field is the authored value that will be emitted when this node fires. Line 3 lists the cueOut field, which sends an event with the value of cueValue when this node fires.

The following code portion illustrates the TimeCue node.

```
1) Timecue: CueNode {
2)   field Time cueTime 0
   }
```

This object sends the current wall clock time as an event to cueTime when TimeCue fires. Line 2 of the code portion lists the cueTime field, which sends an event with the current wall clock time when this node fires.

The scoring construct within the context of real-time scene composition enables the author to declaratively describe temporal control over a wide range of presentation and playback techniques, including: image flipbooks and image composite animations (e.g., animated GIF); video and audio clips and streams; geometric animation clips and streams, such as joint transformations, geometry morphs, and texture coordinates; animation of rendering parameters, such as lighting, fog, and transparency; modulation of parameters for behaviors, simulations, or generative systems; and dynamic control of asset loading, event muting, and logic functions. For instance, the following example emits a string to pre load an image asset, then performs an animation using that image, then runs a movie. The string in the following example can also be run in reverse (i.e., first the movie plays backwards then the animation plays backward and then the image disappears).

```
1) Score {
2)   timeBase DEF TB TimeBase {
3)   cue[
4)   Fieldcue {
5)     cueValue String " "
6)     cueout TO ISURF.URL
7)     direction -1
8)   }
9)   FieldCue {
10)    cueValue String "imagel.png"
11)    cutOut TO ISURF.url
12)    direction -10
13)  }
14)  IntervalCue{
15)    delay 0.5
16)    period 2.5 # 2.5 second animation
17)    Fraction TO Plfraction
18)  }
19)  DEF MC MediaCue {
20)    offset 2
21)  }
22)  Fieldcue {
23)    cueValue String ""
24)    cueOut TO ISURF.URL
25)    direction -1
26)    delay -0.5
27)  }
28)  Fieldcue {
29)    cue Value String "imagel.png"
30)    cueOut TO ISURF.URL
31)    direction -1
32)    delay -0.5
33)  }
34)  ]
35) }
36) # Slide out image
37) DEFT Transform {
38)   children Shape {
39)     appearance Appearance {
40)       texture Texture {
41)         surface DEF ISURF ImageSurface {}
42)       }
43)     }
44)     geometry IndexedFaceSet {...}
45)   }
46) }
47) DEF P1 PositionInterpolator
48)   key...
49)   keyValue...
50)   value TO T.translation
51) }
52) # Movie
53) Shape {
54)   appearance Appearance {
55)     texture Texture {
56)       surface MovieSurface {
57)         url "myMovie.mpg"
58)         timeBase USE MC
59)       }
60)     }
61)   }
62)   geometry IndexedFaceSet {...}
63) }
```

In one embodiment, the Cue nodes in a Score fire relative to the media time of the TimeBase, providing a common reference and thereby resulting in an accurate relationship between timing of various media assets. In the code snippet above, the FieldCue (line 9) fires as soon as the TimeBase starts because this FieldCue has default offset and delay fields thereby making the image appear. Lines 35-45 of the code portion loads the image (200, FIG. 2A) on a surface. The IntervalCue (line 13) then starts 0.5 seconds later and runs for the next 2.5 seconds, increasing its fraction output from 0 to 1. The firing of the IntervalCue starts the animation (202, FIG. 2A) of the image. Lines 46-50 control the animation. The MediaCue (line 18) starts 2 seconds after the TimeBase starts, or when the IntervalCue is 1.5 seconds into its animation thereby starting the movie.

Lines 51-62 load the first frame (204, FIG. 2A) of the movie on the surface. When this string is played backwards, first the movie plays in reverse. Then 0.5 seconds later the image appears, and 0.5 seconds after the image appears the animation starts. Animation is played in reverse for 2.5 seconds, when it stops and 0.5 seconds after that the image disappears. This example shows the ability of the Cues to be offset from each other or from the TimeBase and shows that a subsequent Cue can start before the last one has finished.

In one embodiment, the MediaCue gives a synchronization tool to the author. A MediaCue is a form of a Cue, which behaves similar to a TimeBase. In fact, in some instances, a MediaCue can be used where a TimeBase can, as shown in the above example. However, since a MediaCue is embedded in a timed sequence of events, an implementation has enough information to request pre-loading on an asset.

Figure 2A:
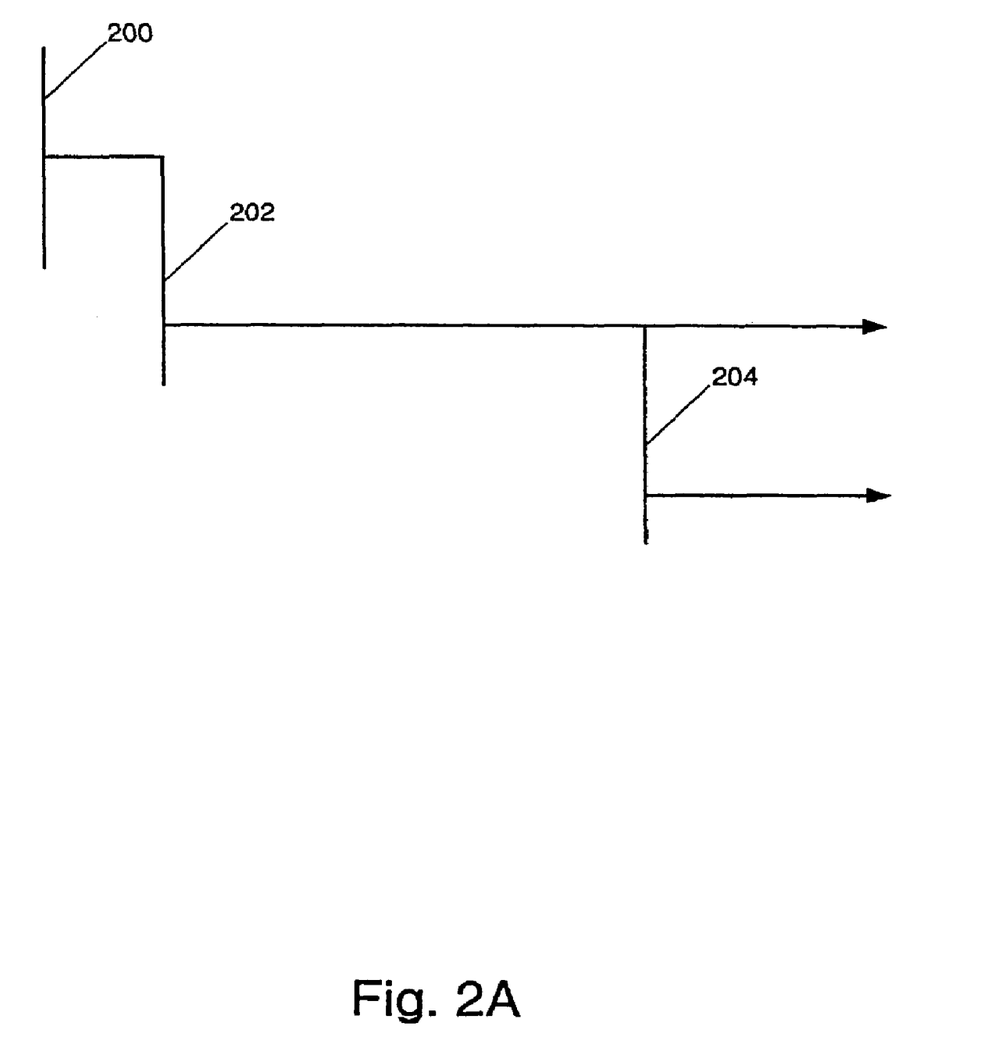
FIG. 2A shows time relationship between media sequences in a score.
Figure 2B:
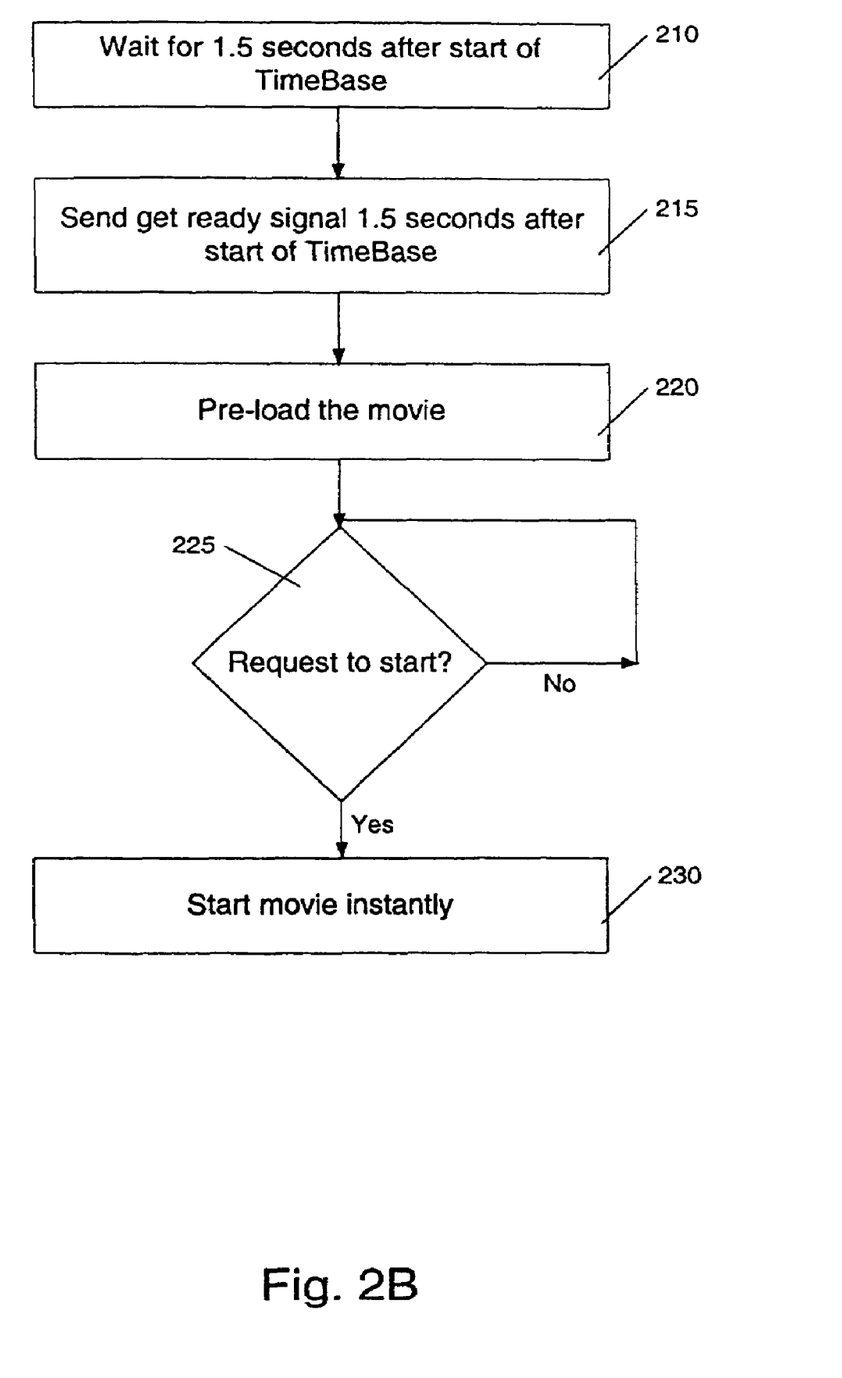
FIG. 2B illustrates synchronization of the media sequence of FIG. 2A requiring preloading

FIG. 2B illustrates synchronization of the media sequence of FIG. 2A utilizing a preloading function. For instance, in the above example, if the implementation knows that a movie takes 0.5 seconds to pre load and play instantly, after waiting (Block 210) 1.5 seconds after the start of the TimeBase, in Block 215, a "get ready" signal is sent to the MovieSurface. Upon receipt of get ready signal, in Block 220 the movie is pre-loaded. This would provide the requested 0.5 seconds to pre-load.

In Block 225, a request to start is received, and upon receipt of the request to start, Block 230 starts the movie instantly.

Figure 3:
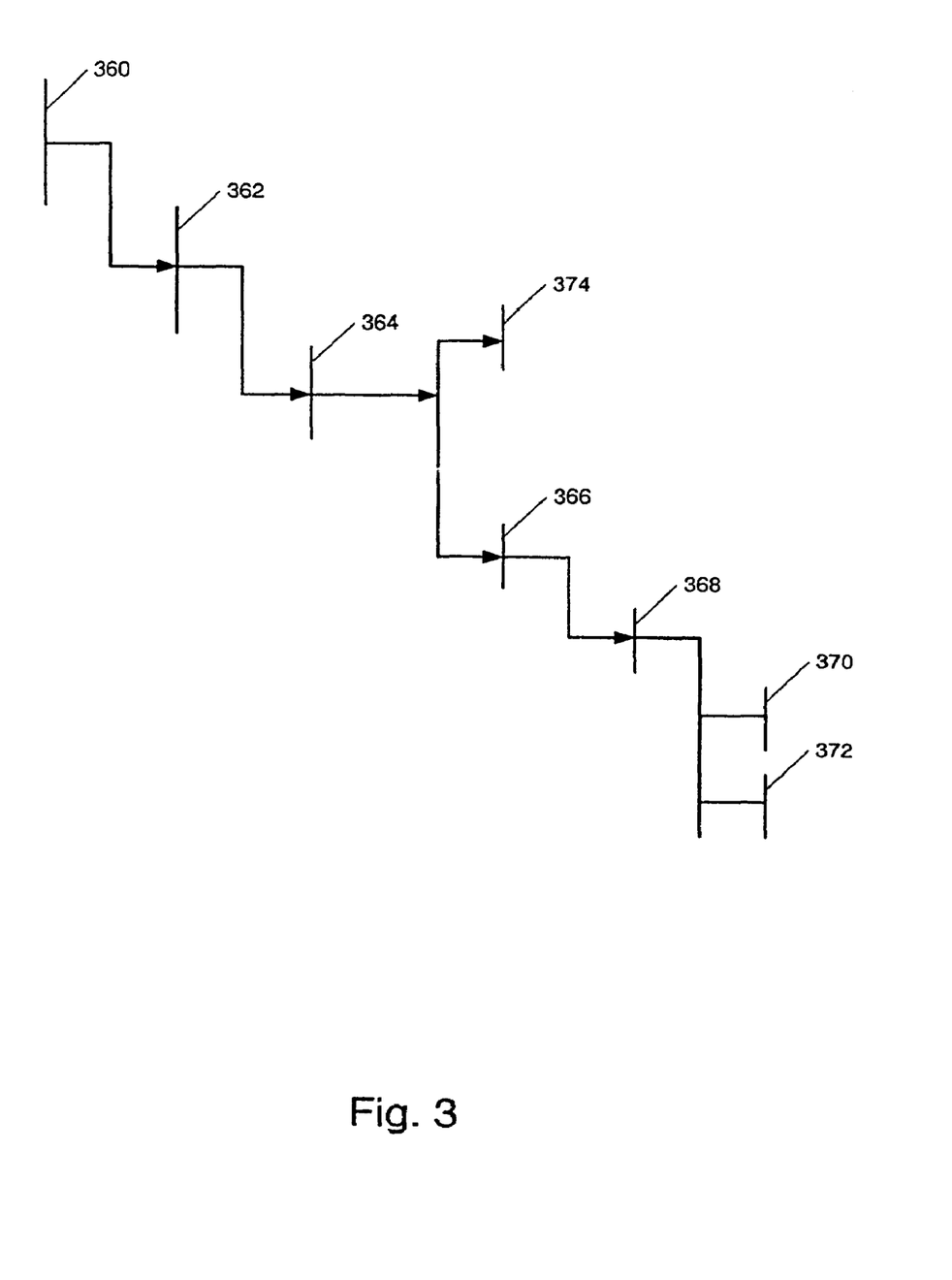
FIG. 3 illustrates one embodiment of time relationships between various constituent media of an interactive presentation.

The combination of the TimeBase and media sequencing capabilities allowed in the system 11 makes it possible to create presentations with complex timing. FIG. 3 shows time relationships of various components of the system 11. A viewer, upon selecting news presentation (360), sees a screen wherein he can select a story (362). Upon the user selecting story S3 from a choice of five stories S1, S2, S3, S4 and S5, a welcome screen with an announcer is displayed (364). On the welcome screen the Viewer can choose to switch to another story (374) thereby discontinuing story S3. After the welcome statement, the screen transitions to the site of the story (366) and the selected story is played (368). At this point, the viewer can go. to the next story, the previous story, rewind the present story or select to play an extended version of story (370) S3 or jump to (372), for example, another story S5. After the selected story is played the user can make the next selection.

The integration of surface model with rendering production and texture consumption allows nested scenes to be rendered declaratively. Recomposition of subscenes rendered as images enables open-ended authoring. In particular, the use of animated sub-scenes, which are then image-blended into a larger video context, enables a more relevant aesthetic for entertainment computer graphics. For example, the image blending approach provides visual artists with alternatives to the crude hard-edged clipping of previous generations of windowing systems.

Figure 4:
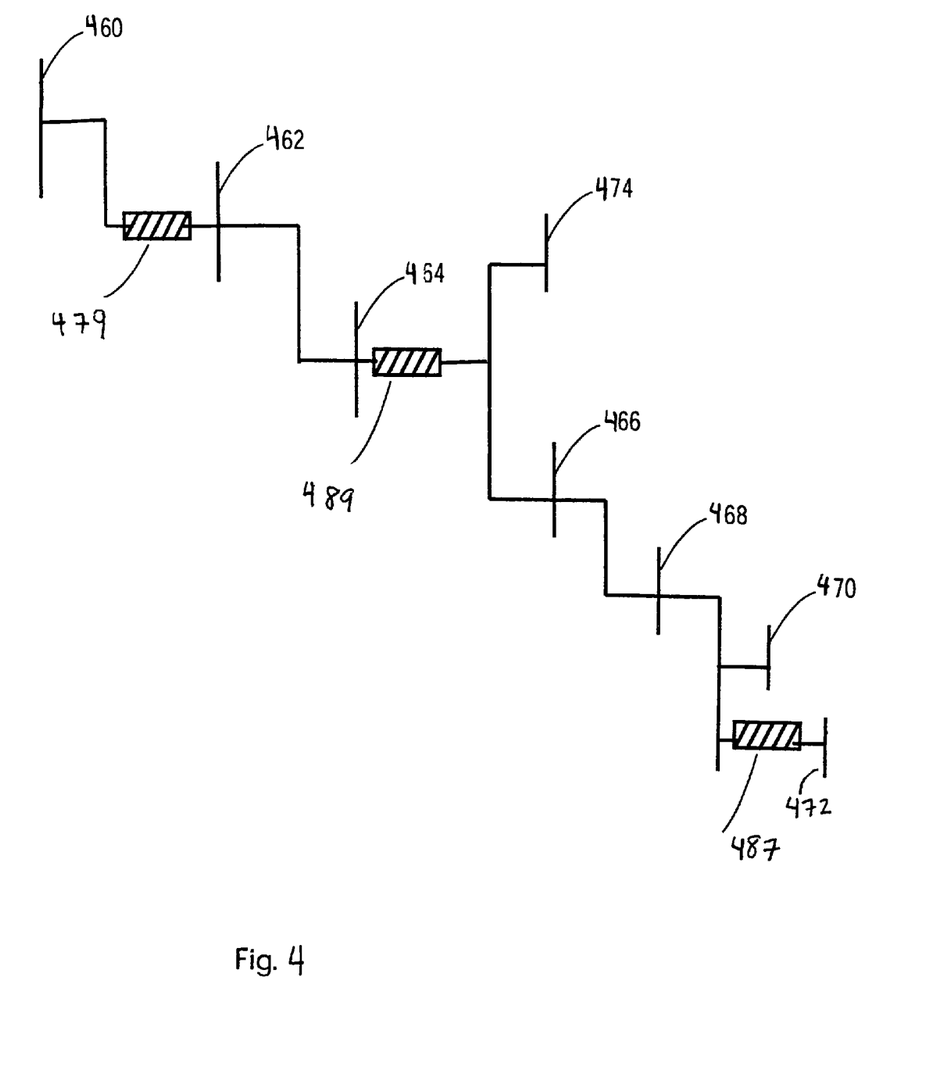
FIG. 4 illustrates one embodiment of time relationships between various constituent media of an interactive presentation.

FIG. 4 shows time relationships of various components of the system 11. Similar to FIG. 3, a viewer, upon selecting news presentation (460), sees a screen wherein he can select a story (462). The welcome screen with an announcer is displayed (464). On the welcome screen the viewer can choose to switch to another story (474) thereby discontinuing story S3. After the welcome statement, the screen transitions to the site of the story (466) and the selected story is played (468). At this point, the viewer can go to the next story, the previous story, rewind the present story or select to play an extended version of story (470) S3 or jump to (472), for example, another story S5. In one embodiment, after the selected story is played the user can make the next selection. In another embodiment, the user can make the next selection at any time.

In addition, TimeBase also allows a "stopping time" function that pauses the current actions to occur. By pausing the current actions, the clock is temporarily stopped. In one embodiment, pausing the current action allows debugging operations to be performed. In another embodiment, pausing the current actions allows the viewer to experience the current actions at a slower pace.

In one embodiment, a stop block (479) is utilized to pause the display of various selections after the selection of the news presentation (460) and prior to the display of the screen to select the story (462). In another embodiment, a stop block (489) is utilized to pause the display of a user's choice prior to a selection being made. For example, the stop block (489) allows the possible selections to be presented on the welcome screen (464) and prevents the selection of the story (474) or the story (466). In another embodiment, a stop block (487) is utilized to pause the display content (472) after the choice for the content (472) has been selected.

In one embodiment, the stop blocks (479, 489, and 487) pauses the action for a predetermined amount of time. In another embodiment, the stop blocks (479, 489, and 487) pauses the action until additional input is received to resume the action.

Figure 5:
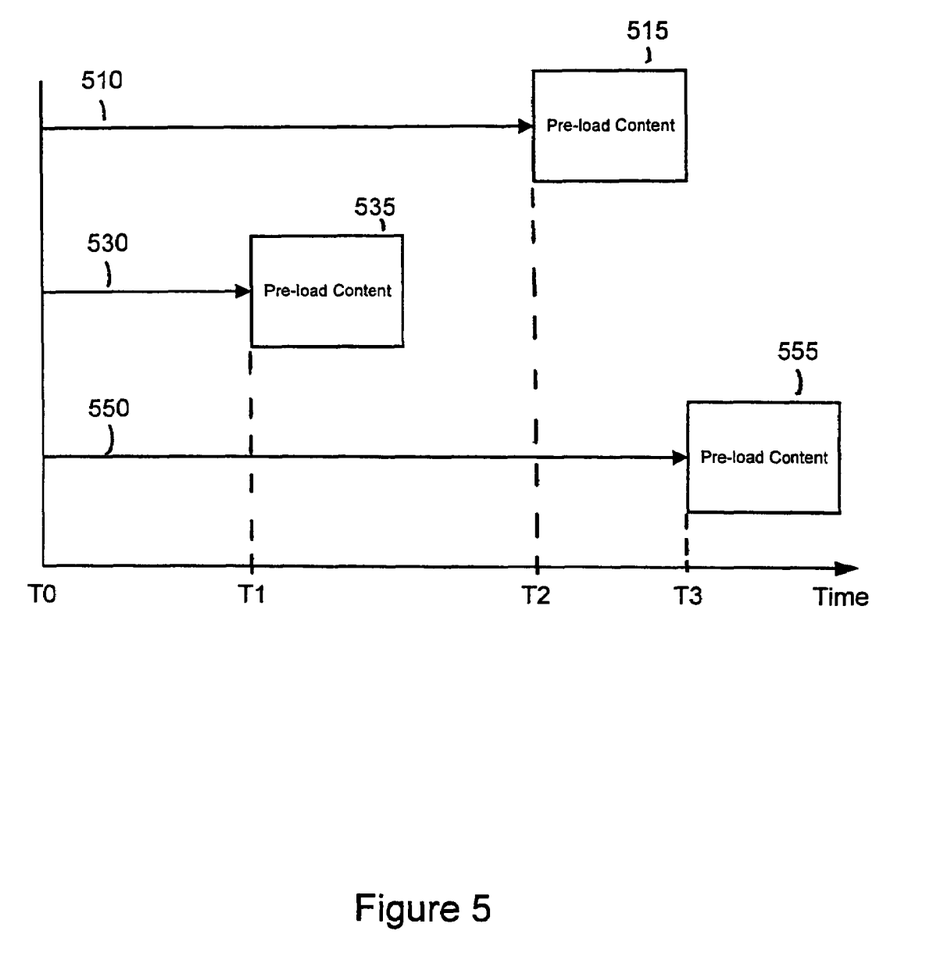
FIG. 5 illustrates one embodiment of time relationships between various constituent media of an interactive presentation.

FIG. 5 illustrates exemplary embodiments of playing current content and pre-loading based on the system 11. In one embodiment, the current content 510, 530, and 550 contain identical content. In one embodiment, the current content 510, 530, and 550 are initiated and begin playing at the same time T0.

For example, the current content 510 is shown to be arbitrarily played at a rate of 25 frames per second. In this embodiment, the pre-load instructions 515 are transmitted at time T2. In one embodiment, the pre-load instructions 515 are transmitted 1.5 seconds prior to the completion of playing the current content 510. The pre-load instructions 515 instruct the content that follows the current content 510 to be loaded.

In one embodiment, the current content 530 is shown to be played at a rate of 30 frames per second which is faster than the play rate of the current content 510. In this embodiment, the pre-load instructions 535 are transmitted at time T1. In one embodiment, the pre-load instructions 535 are transmitted 1.5 seconds prior to the completion of playing the current content 530. The pre-load instructions 535 instruct the content that follows the current content 530 to be loaded.

In one embodiment, the current content 550 is shown to be played with an interruption or pause after the initiation of the current content 550 at time T0. In this embodiment, the pre-load instructions 555 are transmitted at time T3. In one embodiment, the pre-load instructions 555 are transmitted 1.5 seconds prior to the completion of the current content 550. In one embodiment, the current content 550 is shown with the same play rate as the current content 510. The pre-load instructions 555 instruct the content that follows the current content 550 to be loaded.

Although the play rates are identified in one embodiment for the current content 510, 530, and 550, any play rate may be utilized.

For this embodiment, the actual time that the pre-load instructions 515, 535, and 555 are transmitted depend on the play rate of the current content 510, 530, and 550 and depend on any pauses or interruptions when playing the current content 510, 530, and 550. Further, the exact location within the current content 510, 530, and 550 when the corresponding pre-load instructions are transmitted depends on the play rate of each current content and their relationship to each other in time.

For example, although the transmission of the pre-load instructions 555 at time T3 occurs later than the transmission of the pre-load instructions 515 at time T2, the location of the current content 510 and 550 when the corresponding pre-load instructions 515 and 555 are transmitted are the same, because the play rate of the current content 510 and 550 are the same. Further, the pause within the current content 550 shifts the transmission of the pre-load instructions 555 by a predetermined time (T3-T2) compared to when the preload instructions 515 are transmitted. In one embodiment, the pause or interruption in the playing of the current content 550 occurs for the predetermined time (T3-T2).

In another example, the pre-load instructions 535 are transmitted at an earlier location of the current content 530 compared to the location of the current content 510 when the pre-load instructions 515 are transmitted. This occurs because the play rate of the current content 530 is faster than the current content 510, and their presented content slip into alignment as they play back.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method of execution by a processor, the method comprising:

generating a scene graph representing content having multiple media sequences, the scene graph comprising nodes in a hierarchical tree structure, the nodes comprising a timebase node that controls advancement of media time within the content, the media time measuring internal time traveling in forward and reverse directions within the content, and a score node that sequences each of the multiple media sequences relative to the media time specified by the timebase node, wherein the score node controls playback of the multiple media sequences in a forward and in a reverse order relative to the media time;

declaratively outputting a first media sequence at a time specified by the score node for the first media sequence; and declaratively initiating a second media sequence at a time specified by the score node for the second media sequence.

2. The method of claim 1, wherein the scene graph comprises a plurality of cue nodes, each cue node associated with one of the multiple media sequences in the content, and wherein the score node comprises a list of the cue nodes.

3. The method of claim 2, wherein the cue node for the second media sequence specifies a delay time that initiates the second media sequence prior to an end time for the first media sequence.

4. The method of claim 2, wherein each cue node specifies playback of the associated media sequence relative to a direction of travel of the media time.

5. The method of claim 2, wherein the score node updates media time information in each cue node in the list as the media time advances.

6. The method of claim 1, wherein the timebase node specifies a rate for the media time.

7. A system comprising:

a processor coupled to a memory through a bus, and further coupled to a display;

a content playback process executed by the processor from the memory to cause the processor to perform operations that generate a scene graph representing content having multiple media sequences, the scene graph comprising nodes in a hierarchical tree structure, the nodes comprising a timebase node that controls advancement of media time within the content, the media time measuring internal time traveling in forward and reverse directions within the content, and a score node that sequences each of the multiple media sequences relative to the media time specified by the timebase node, wherein the score node controls playback of the multiple media sequences in a forward and in a reverse order relative to the media time, declaratively output a first media sequence to the display at a time specified by the score node for the first media sequence, and declaratively initiate a second media sequence at a time specified by the score node for the second media sequence.

8. The system of claim 7, wherein the scene graph comprises a plurality of cue nodes, each cue node associated with one of the multiple media sequences in the content, and wherein the score node comprises a list of the cue nodes.

9. The system of claim 8, wherein the score node updates media time information in each cue node in the list as the media time advances.

10. The system of claim 7, wherein the timebase node specifies a rate for the media time.

11. An apparatus comprising:

means for generating a scene graph representing content having multiple media sequences, the scene graph comprising nodes in a hierarchical tree structure, the nodes comprising a timebase node that controls advancement of media time within the content, the media time measuring internal time traveling in forward and reverse directions within the content, and a score node that sequences each of the multiple media sequences relative to the media time specified by the timebase node, wherein the score node controls playback of the multiple media sequences in a forward and in a reverse order relative to the media time; and means for rendering the content in accordance with the scene graph, wherein the means for rendering declaratively outputs a first media sequence at a time specified by the score node for the first media sequence, and declaratively initiates a second media sequence at a time specified by the score node for the second media sequence.

* * * * *